United States Patent
Sun

(10) Patent No.: US 10,420,105 B2
(45) Date of Patent: Sep. 17, 2019

(54) METHOD FOR RECEIVING DOWNLINK CHANNEL SIGNAL AND USER EQUIPMENT

(71) Applicant: MediaTek Singapore Pte. Ltd., Singapore (SG)

(72) Inventor: Feifei Sun, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/552,976

(22) PCT Filed: Jan. 25, 2017

(86) PCT No.: PCT/CN2017/072631
§ 371 (c)(1),
(2) Date: Aug. 23, 2017

(87) PCT Pub. No.: WO2017/133621
PCT Pub. Date: Aug. 10, 2017

(65) Prior Publication Data
US 2018/0054821 A1    Feb. 22, 2018

(30) Foreign Application Priority Data

Feb. 5, 2016  (CN) .......................... 2016 1 0082034

(51) Int. Cl.
*H04W 72/04*  (2009.01)
*H04W 16/14*  (2009.01)
(Continued)

(52) U.S. Cl.
CPC ....... *H04W 72/0453* (2013.01); *H04W 16/14* (2013.01); *H04W 72/042* (2013.01);
(Continued)

(58) Field of Classification Search
CPC .......... H04W 72/0453; H04W 72/042; H04W 72/1215; H04W 16/14; H04W 72/082; H04W 84/12
See application file for complete search history.

(56) References Cited

U.S. PATENT DOCUMENTS

| | | | |
|---|---|---|---|
| 2015/0188650 A1* | 7/2015 | Au ........................ | H04J 3/1694 370/312 |
| 2016/0037520 A1 | 2/2016 | Wang | |
| 2016/0330630 A1* | 11/2016 | Yoo ....................... | H04L 1/0003 |

FOREIGN PATENT DOCUMENTS

| | | |
|---|---|---|
| CN | 102546074 A | 7/2012 |
| WO | WO 2015/096821 A1 | 7/2015 |
| WO | 2015188848 A1 | 12/2015 |

OTHER PUBLICATIONS

International Search Report dated Apr. 7, 2017, issued in application No. PCT/CN2017/072631.

(Continued)

*Primary Examiner* — Lakeram Jangbahadur
(74) *Attorney, Agent, or Firm* — McClure, Qualey & Rodack, LLP

(57) ABSTRACT

Methods and UE for receiving downlink channel signals are provided, wherein, a method for receiving DL channel signal, includes: a user equipment receives configuration information of a second system on a first system, wherein the time-frequency resource of the first system and the time-frequency resource of the second system are overlapped. the UE determines one or more time-frequency resources for receiving downlink signals. The UE receives the downlink signals at the time-frequency resources; and processes the downlink signals according to the configuration information of the second system. The method and equipment provided could be used for receiving methods (Continued)

and apparatus in a multiple-system co-existence system, and could enhance the system performance.

12 Claims, 12 Drawing Sheets

(51) Int. Cl.
    *H04W 72/12*     (2009.01)
    *H04W 72/08*     (2009.01)
    *H04W 84/12*     (2009.01)

(52) U.S. Cl.
    CPC ...... *H04W 72/1215* (2013.01); *H04W 72/082* (2013.01); *H04W 84/12* (2013.01)

(56) References Cited

OTHER PUBLICATIONS

Martin Beale; "Future Challenges in Efficiently Supporting M2M in the LTE Standards;" Workshop on Internet of Things Enabling Technologies, Embracing Machine-to-Machine Communications and Beyond; pp. 186-190; published on Apr. 1, 2012 in Chippenham, UK.

"NB-LTE-Inband operation;" No. 14.1.1, Ericsson, Alcatel-Lucent, Shanghai Bell, Nokia, Intel, STE, Samsung, LGE, Published on Sep. 15, 2015 in Phoenix, AZ.; pp. 1-14.

"NB-LTE-Concept Descriptio;" L1, No. 14.1.1, Ericsson, Alcatel-Lucent, Shanghai Bell, Intel, LG Electronics, Nokia, ZTE, Published on Sep. 16, 2015 in Phoenix, AZ.; pp. 1-24.

\* cited by examiner

○ The reference signal of the first system

METHOD FOR RECEIVING DOWNLINK CHANNEL SIGNAL AND USER EQUIPMENT

CROSS REFERENCE TO RELATED APPLICATIONS

This application claims the priority of China Patent Application No. CN20160082034.9, filed on Feb. 5, 2016, the entirety of which is incorporated by reference herein.

FIELD OF THE INVENTION

The invention relates to wireless communications, and more particularly to the methods and apparatus for receiving signals when there are two systems operating in one band.

DESCRIPTION OF THE RELATED ART

With rapid developments in the cellular mobile communications industry, there is more and more attention and research being paid to fifth-generation (5G) mobile communications systems. One of the most important developments of 5G mobile communications is the ability to provide services in one band. In other words, the systems that provide different services may be different systems or different subsystems of one system: For example, several subsystems operating in one system bandwidth (BW).

In the development of the LTE system, research into optimization of the Low-cost MTC (LC MTC) service has been started when formulating the standards of LTE version 11 (release 11, the R11). The user equipment (UE) for MTC terminal Cat-0 (Category-0) has been published in LTE R12. The Cat-0 user equipment maintains the broadband RF and reduces the requirements on the baseband (BB) signal processing capability. The in-process LTE version 13 (R13) standards are now focusing on developing a low-cost (LC) MTC terminal which costs less than the Cat-0 user equipment. The new MTC terminal supports only the 1.4 MHz RF bandwidth. In the newly developed item—the Narrow Band Internet of Thing (NB IoT) in the LTE R13 standards—the bandwidth of the RF band is reduced further to 180 kHz, and in-band deployment is supported. That is, a narrow band IoT system has been deployed in the existing LTE band. The goal of designing the NB IoT is not to affect the original LTE terminals. For example, the NB IoT system can co-exist with the original LTE system via network scheduling. However, some performance will be sacrificed if there is only network scheduling. Therefore, several methods and apparatus for receiving signals when there are multiple systems co-existing in the apparatus are proposed to improve system performance.

BRIEF SUMMARY OF THE INVENTION

According to a novel aspect of the invention, a method for receiving downlink channel signals comprises: receiving configuration information of a second system on a first system by user equipment (UE), wherein time-frequency resources of the first system and time-frequency resources of the second system are overlapped; determining one or more time-frequency resources for receiving downlink signals; receiving the downlink signals at the time-frequency resources by the UE; and processing the downlink signals according to the configuration information of the second system. The method further comprises determining the one or more time-frequency resources for receiving the DL signals by the UE according to pre-defined information of the second system or the configuration information of the second system. The maximum communication bandwidth of the second system is narrower than the maximum communication bandwidth of the first system. The maximum communication bandwidth of the second system is broader than the maximum communication bandwidth of the first system. The configuration information of the second system comprises one or more of the followings: the presence of the second system, the frequency domain position of the time-frequency resources used by the second system, the cell ID of the second system, reference signal information of the second system, the system frame number SFN of the second system, and the time domain position of the time-frequency resources used by the second system. The pre-defined information of the second system comprises one or more of the followings: the time-frequency resources of broadcast information of the second system, the time-frequency resources of a synchronization signal of the second system, the sequence of the synchronization signal of the second system, and the reference signal information of the second system. The reference signal information of the second system comprises one or more of the followings: reference signal power information of the second system, a sub-frame carrying the reference signal of the second system, parameters for generating a reference signal sequence of the second system, and the information for calculating the position of a time-frequency resource of the reference signal in a sub-frame of the second system. The reference signal power information of the second system comprises power offset of the reference signal of the second system and the reference signal of the first system, or power offset of the reference signal of the second system and the data channel signal of the second system, or power offset of the reference signal of the second system and the data channel signal of the first system.

According to another novel aspect of the invention, the UE eliminates the time-frequency resources occupied by the second system according to the configuration information of the second system received on the first system to obtain the time-frequency resources available for the first system.

According to another novel aspect of the invention, the UE detects the signal of the second system according to the configuration information of the second system received on the first system, and uses the signal detection result to facilitate the detection or modulation of the signal of the first system. The signal of the second system is the synchronization signal or the reference signal of the second system.

According to another novel aspect of the invention, UE operating on a first system comprises: an RF transceiver, receiving RF signals, receiving configuration information of a second system on the first system and receiving DL signals; and a processor, determining one or more time-frequency resources for receiving the DL signals according to the configuration information of the second system received on the first system, and processing the DL signals received at the time-frequency resources according to the configuration information of the second system, wherein the time-frequency resource of the first system and the time-frequency resource of the second system are overlapped. The processor determines the one or more time-frequency resources for receiving the DL signals further according to pre-defined information of the second system. The maximum system bandwidth used by the second system is narrower than the maximum system bandwidth used by the first system. The maximum system bandwidth used by the second system is broader than the maximum system bandwidth used by the first system.

According to another novel aspect of the invention, the base station broadcasts the information of the second system on a portion of the UE resource occupying the first system, wherein the information of the second system comprises one or more of the followings: presence of the second system, frequency domain position of the time-frequency resources used by the second system, a cell identifier (ID) of the second system, reference signal information of the second system, system frame number (SFN) of the second system and time domain position of the time-frequency resources used by the second system. The pre-defined information of the second system comprises one or more of the followings: the time-frequency resources of broadcast information of the second system, the time-frequency resources of a synchronization signal of the second system, the sequence of the synchronization signal of the second system and reference signal information of the second system. The reference signal information of the second system comprises one or more of the followings: reference signal power information of the second system, a sub-frame carrying the reference signal of the second system, parameters for generating a reference signal sequence of the second system and the information for calculating the position of a time-frequency resource of the reference signal in a sub-frame of the second system.

According to another novel aspect of the invention, the reference signal power information of the second system comprises power offset of the reference signal of the second system and the reference signal of the first system, or power offset of the reference signal of the second system and the data channel signal of the second system, or power offset of the reference signal of the second system and the data channel signal of the first system.

According to another novel aspect of the invention, the processor obtains the time-frequency resources available for the first system by precluding the time-frequency resources occupied by the second system according to the configuration information of the second system received on the first system, receives the DL signals via the RF transceiver at the time-frequency resource of the first system with the time-frequency resources occupied by the second system have been eliminated, and decodes or detects the DL signals.

In one example, the base station configures the information of the second system to the UE via higher layer signaling (e.g., RRC signaling) or physical layer (PHY) signals, such as downlink control information (DCI). For example, the base station configures the information of the second system by the broadcast channel of the first system or configures the information of the second system by UE specific signal. The UE of the first system may receive the configuration information of the second system on the resources of the first system so as to help the UE to better decode the channel signal of the first system.

According to another novel aspect of the invention, a time-frequency resource (e.g., PRB) configured for the EPDCCH search of the first system may contain the time-frequency resource occupied by the second system, but the EPDCCH is not transmitted on the time-frequency resource occupied by the second system.

The summary is merely illustrative of the invention and is not intended to be limiting to the invention. Various embodiments and advantages of the present invention will be further described below.

BRIEF DESCRIPTION OF DRAWINGS

Embodiments of the present invention will now be described with reference to the accompanying drawings in which like numerals refer to like elements.

Reference will now be made in detail to some embodiments of the invention.

DETAILED DESCRIPTION OF THE INVENTION

Some terms are used in the specification and claims to refer to specific components. It will be understood by those skilled in the art that the manufacturer may use different terminologies to refer to the same component. The present specification and claims do not serve as a means of distinguishing components by differences in their names, but rather as a distinguishing criterion for functional differences of the components. The term "comprising" used in the specification and claims is referred to as open language and should be construed as "comprising but not limited to". The word "coupled" here contains any direct and indirect electrical connection means. Indirect electrical connection means includes connection via other manners The embodiments of the present invention will now be described with reference to the accompanying drawings, which are for illustrative purposes only and are not intended to limit the scope of the invention.

Figure 1A:
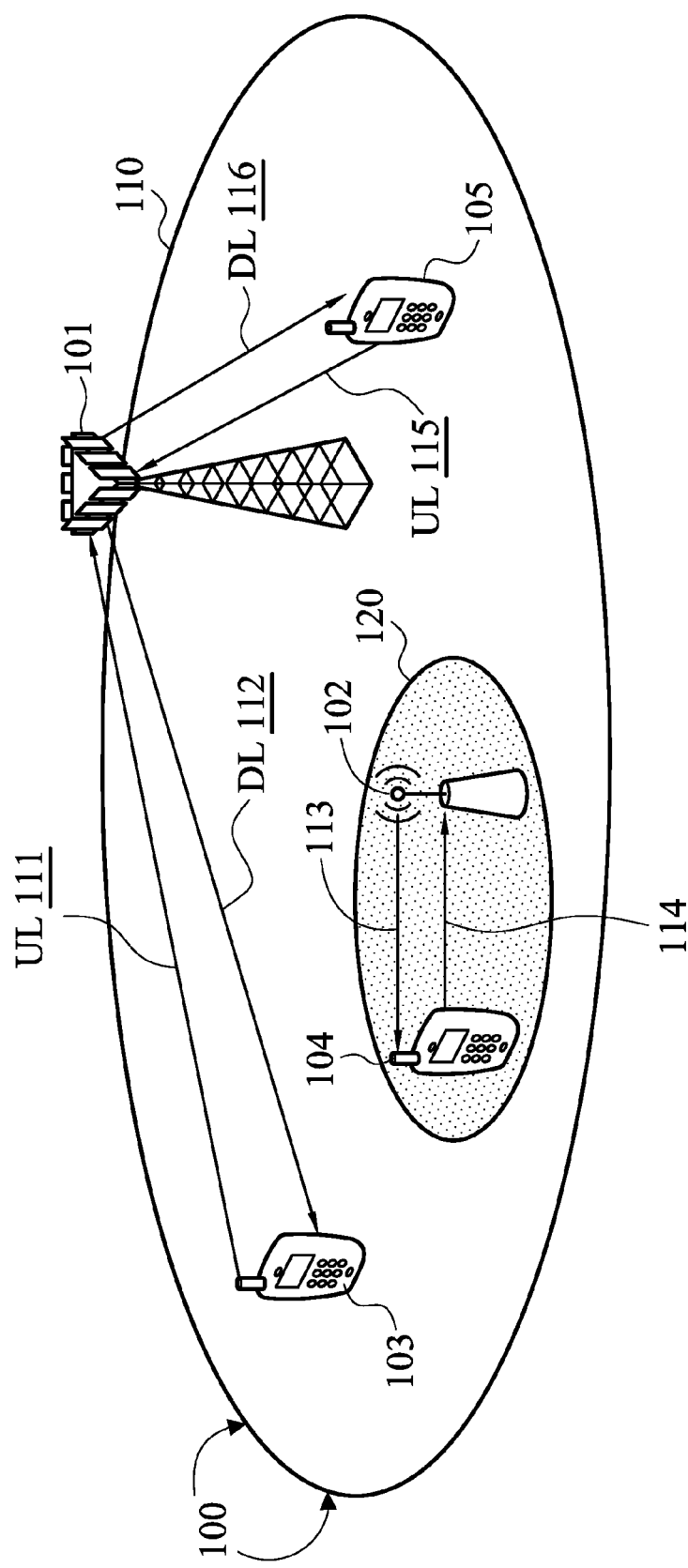
FIG. 1A is a schematic diagram of a wireless communications system according to one embodiment of the invention.

FIG. 1A is a schematic diagram of a wireless communications system according to one embodiment of the invention. The wireless communications system 100 may comprise one or more basic units 101 and 102 to form one or more access networks 110 and 120 distributed within a geographic area. The access networks 120 and 110 may use a Universal Terrestrial Radio Access Network (UTRAN) using WCDMA technology, E-UTRAN using LTE/LTE-A technology, access networks using GSM/GPRS technology, or access networks using a narrowband Internet of Things (NB-IoT) technology. The communications unit may also be referred to as a base station, an access point, a base station node B, an evolved node B (eNB), or other terminologies in the art. For convenience, the basic units are referred to as base stations in the following paragraphs. In some systems, one or more base stations are coupled to a controller to form an access network that communicates with one or more core networks.

In FIG. 1A, one or more User Equipment (UE) 103, 104 and 105 are wirelessly coupled to base stations 101 and 102 for obtaining wireless communication services in a service area, such as a cell or a sector of a cell. The UE may be referred to as user equipment (UE), a wireless communications device, a terminal, or others. Although the UE 103, the UE 104, and the UE 105 are shown as hand-held terminals in FIG. 1A, these UEs are not limited hand-held terminals, but may be non-hand-held terminals, IoT terminals, or a large-sized devices. The UE 103 and the UE 105 may transmit the UL data to the base station 101 through the UL channel 111 and the UL channel 115, respectively, in the time and/or frequency domain. The UE 104 may transmit the UL data to the base station 102 through the UL channel 114 in time and/or frequency domain. The serving base stations 101 and 102 may transmit the DL signals to the UEs 103, 104 and 105 through the DL channels 112, 113 and 116, respectively. In one embodiment, the communications system may use OFDMA technology or multi-carrier technology on the DL transmission, and regarding the UL transmission, the communications system may use a next-generation single carrier (Single-Carrier, SC) technique based on OFDMA technology or FDMA architecture or other single carrier technology, such as single carrier technology based on GMSK modulation, where the OFDMA technology, multi-carrier technology or FDMA-based single carrier technology adopts adaptive modulation and coding (AMC) architecture. FDMA-based SC technology comprises interleaved FDMA (IFDMA), localized FDMA (LFDMA), and DFT spread spectrum OFDM (DFT-SOFDM) with IFDMA or LFDMA. FDMA-based SC technology also comprises ordinary single carrier technology, that is, each user occupies a carrier. In an OFDMA-based system or other multi-carrier technology, a remote unit (i.e., UE) is served by a designated DL or UL resource, wherein the designated DL or UL resource typically comprises one or more OFDM symbols or a set of sub-carriers on the time domain symbols of the multi-carrier system. In a single carrier system, a DL or UL resource typically comprises one or more time slots. Exemplary protocols based on OFDMA may comprise the 3GPP UMTS LTE standard and the IEEE 802.16 standard. The spread spectrum technique may also be applied in the communications architecture. The spread spectrum technique may comprise, for example, multi-carrier CDMA (Multi-Carrier CDMA, MC-CDMA) having a one-dimensional or two-dimensional spread spectrum, multi-carrier direct sequence CDMA (MC-DS-CDMA), Orthogonal Frequency and Code Division Multiplexing (OFCDM), multiplexing/multiplexing techniques based on simpler time divisions and/or frequency divisions, or any combination of the above-mentioned techniques. In other embodiments, the communications system may also adopt the protocols of other cellular communication systems. The other cellular communication technologies may, for example, be TDMA or direct sequence CDMA (DS-CDMA), but they are not limited thereto. The disclosure is not limited to any particular wireless communications system.

In FIG. 1A, in the wireless communications system 100, the base station 101 may simultaneously serve different versions of UEs, such as the UE 103 and the UE 105, wherein the UE 105 is a UE of the first system supporting the legacy version, and the UE 103 is a UE of the first system supporting new version. For a new version UE of the first system, the UE may obtain more information than the legacy version UE, such as a new feature supported in the new version. More specifically, in the LTE system, the base station 101 is a base station that supports the LTE system (the first system) and also supports the NB-IoT system the (second system), and the UE 103 is Rel-8/9/10/11/12 version UE, and UE 105 is a Rel-13 version UE. Therefore, the base station 101 may provide LTE and NB-IoT communication services for the UE 103, and provide the LTE communication services for the UE 105. In one example, the time-frequency resources (also called the radio resources) of the first system and the time-frequency resources of the second system are overlapped. That is, the devices operating in the first system and the devices operating on the second system can perform transmission using the same time-frequency resources. According to one embodiment of the invention, the communication bandwidth used by the second system may be narrower than the communication bandwidth used by the first system, and thus the second system may be regarded as occupying part of the resources of the first system. For example, the intra-band deployment of the second system, such as the NB-IoT system, occupies the resources of the first system, such as one or more physical resource blocks (PRBs) within the LTE band. The base station may, by way of scheduling, avoid the channels or signals of the second system being received or decoded by the legacy version UE in the first system. However, this will impact the performance of the first system. For example, in the LTE system, the resource block groups (RBGs) is used in some types of resource allocation of the physical downlink shared channel (PDSCH). One RBG comprises one or more PRBs. However, the NB-IoT system may only occupy one of the PRBs. Therefore, due to the presence of the NB-IoT system, it may be unable to use the entire RBG. Or, via puncturing in the lagency system, the PRB not occupied by the NB-IoT system can be used. However, the puncturing approach directly discards the data which may be transmitted on the PRB occupied by the NB-IoT system, and this will seriously affect the decoding performance. Meanwhile, if the new version UE can know the presence of the NB-IoT system, the new version UE can perform rate-matching on the DL resources occupied by the NB-IoT system according to the information regarding the NB-IoT system. Moreover, the new version UE may utilize the signals of the NB-IoT system to improve the decoding performance of the DL channel or the performance of the DL channel measurements.

Figure 1B:
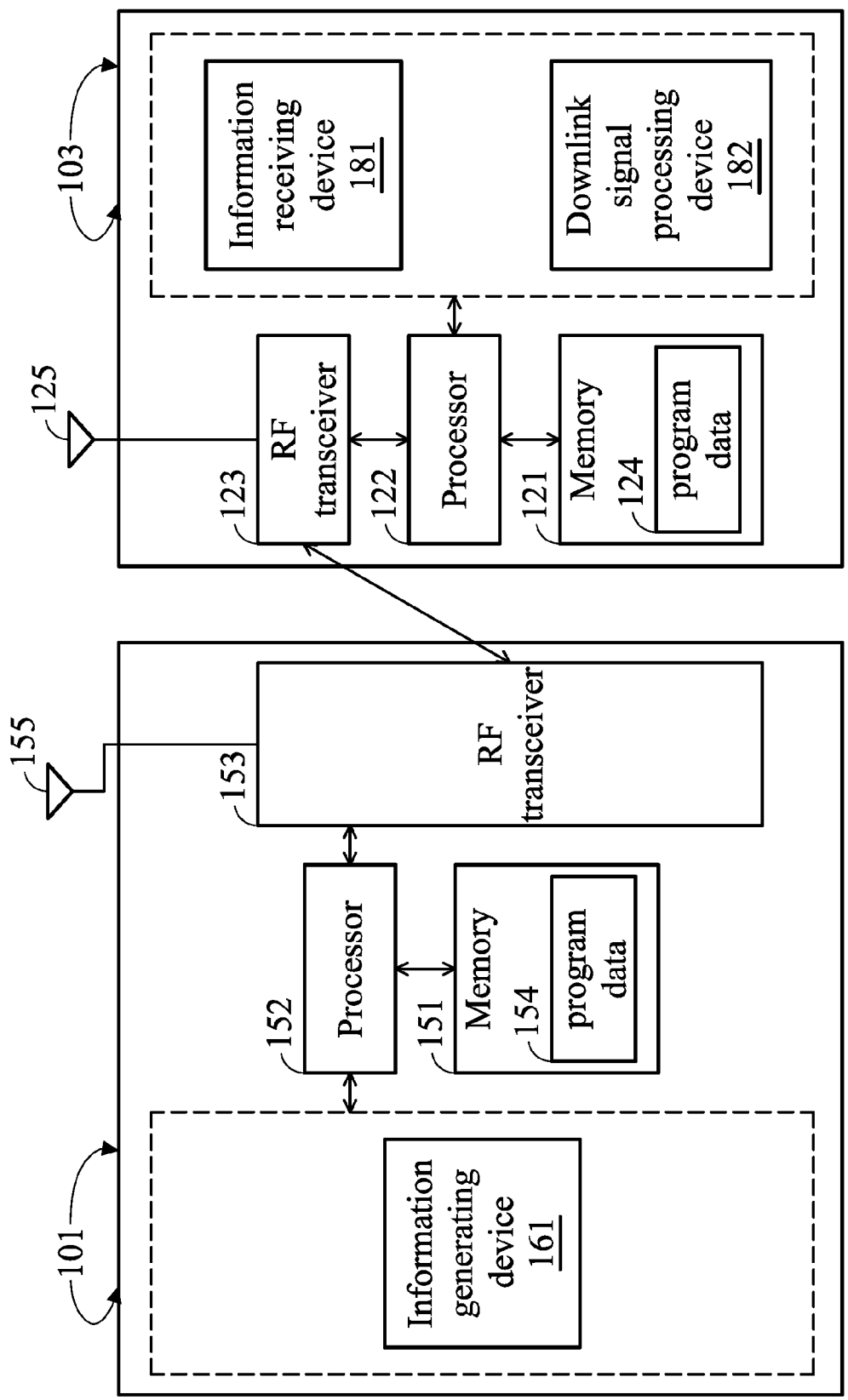
FIG. 1B is a simplified block diagram of a UE 103 and a base station 101 in a wireless communications system according to one embodiment of the invention.

FIG. 1B is a simplified block diagram of a UE 103 and a base station 101 in a wireless communications system according to one embodiment of the invention. The base station 101 may comprise an antenna 155. The antenna 155 transmits and receives radio signals. The radio frequency (RF) transceiver 153 is coupled to the antenna, receives the RF signals from the antenna 155, converts the RF signals into baseband signals, and transmits the baseband signal to the processor 152. The RF transceiver 153 also converts the baseband signals received from the processor 152, converts the baseband signals into RF signals, and sends the RF signals to the antenna 155. The processor 152 processes the received baseband signals and invokes different functional modules to implement the functions in the base station 101. The memory 151 stores program instructions and data 154 to control the operation of the base station 101.

According to one embodiment of the invention, the base station 101 may further comprise other functional components for implementing embodiments of the invention. For example, the base station 101 may comprise information generating device 161 for generating information of the second system. In another example, the information generating device 161 may be used to generate time-frequency resources (e.g., PRBs) information for enhanced physical downlink channel (EPDCCH) search space of the first system, wherein the time-frequency resource information comprises the position of time-frequency resources occupied by the second system. Herein only a portion of the devices for implementing the embodiment of the invention is shown, which may be implemented in hardware, software or firmware, or a combination of any of the above, and the invention is not limited thereto.

The UE 103 may comprise an antenna 125. The antenna 125 transmits and receives RF signals. The RF transceiver 123 is coupled to the antenna, receives the RF signals from the antenna 125, converts the RF signals into baseband signals, and sends the baseband signals to the processor 122. The RF transceiver 123 also converts the baseband signals received from the processor 122 into RF signals, and transmits the RF signals to the antenna 125. The processor 122 processes the received baseband signals and invokes different functional modules to implement the functions in the UE 103. The memory 121 stores program instructions and data 124 to control the operations of the UE 103.

According to one embodiment of the invention, the UE 103 may also comprise other functional components for implementing embodiments of the invention. For example, the UE 103 may comprise an information receiving device 181 for receiving configuration information of the second system on the first system (for example, the UE 103 is a UE operating on the first system and receive the configuration information of the second system on the radio resource of the first system) (herein, the term "operating on the first system" may refer to associated with or camping on the base station of the first system and communicating with the base station and using the services provided by the base station). The downlink (DL) signal processing device 182 receives and processes the DL signals. Herein only a portion of the devices for implementing the embodiment of the invention is provided, which may be implemented as a dedicated hardware, or software or firmware, or a combination of any of the above, and the invention is not limited thereto. For example, according to one embodiment of the present invention, the information receiving device 181 and the DL signal processing device 182 may also be the function modules implemented by software and executed by the processor 122. Therefore, in some embodiments of the invention, the behavior of receiving the above-described configuration information of the second system on the first system and processing the DL signals may also be performed by the processor 122 of the UE.

Figure 2A:
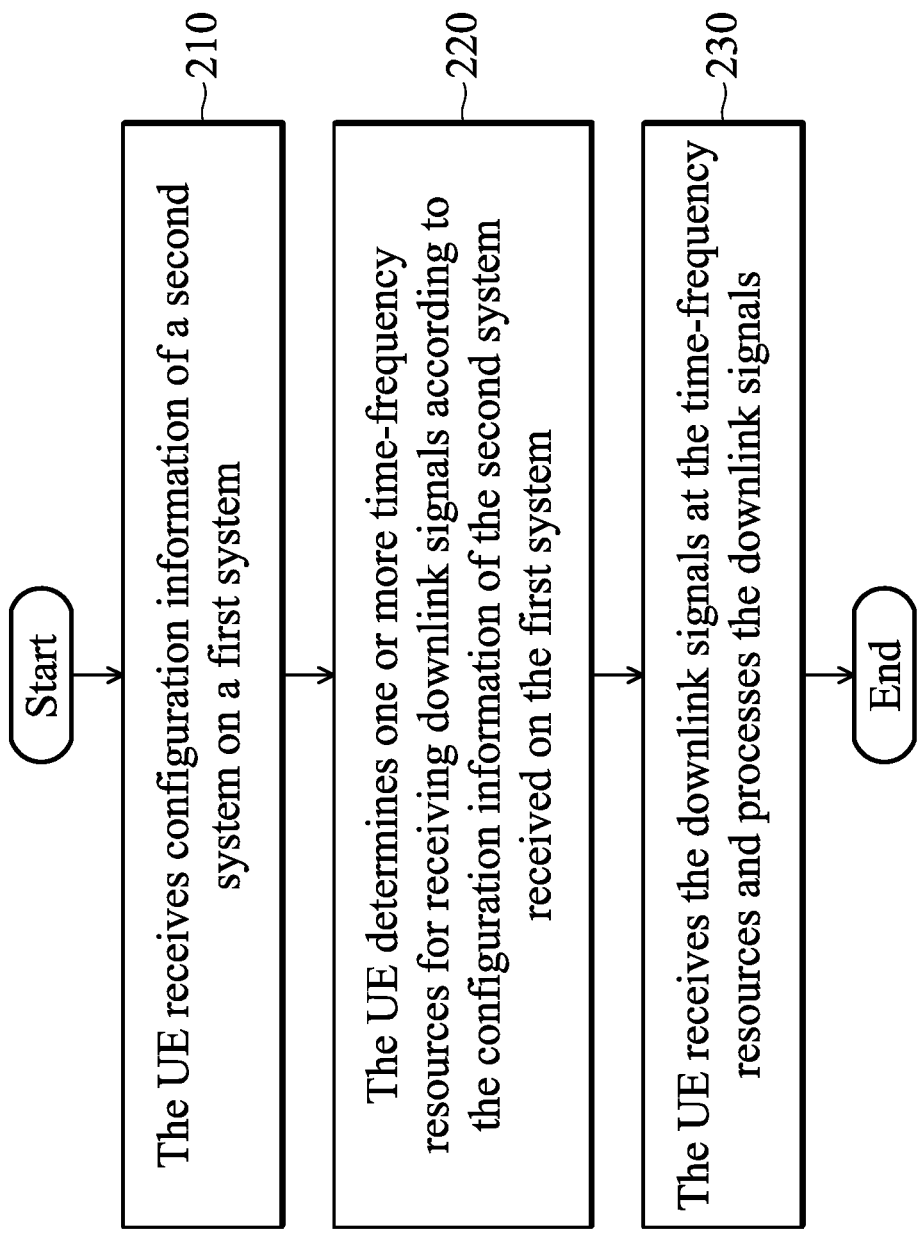
FIG. 2A is a flowchart of receiving downlink (DL) signals by a UE according to one embodiment of the invention.

FIG. 2A is a flowchart of receiving DL signals by a UE according to one embodiment of the invention. As shown in FIG. 2A, in one embodiment, a method for receiving signals comprises:

Step 210: The UE receives the configuration information of the second system on the first system from the base station, wherein the time-frequency resource of the first system and the time-frequency resource of the second system are overlapped, and the base station is a base station that supports the operations of both the first system and the second system. Therefore, the base station can provide the configuration information of the second system.

Step 220: The UE determines one or more time-frequency resources for receiving DL signals according to the configuration information of the second system received on the first system.

Step 230: The UE receives the DL signals at the time-frequency resources and processes the DL signals.

To be more specific, in one embodiment, the information receiving device 181 of the UE may be operable to receive the configuration information of the second system on the first system; the DL signal processing device 182 may be operable to receive and process the DL signals; the processor 122 may determine one or more time-frequency resources for receiving the DL signals based on the configuration information of the second system received on the first system and controls the DL signal processing device 182 to receive the DL signals at the determined time-frequency resource and process the DL signals.

Figure 2B:
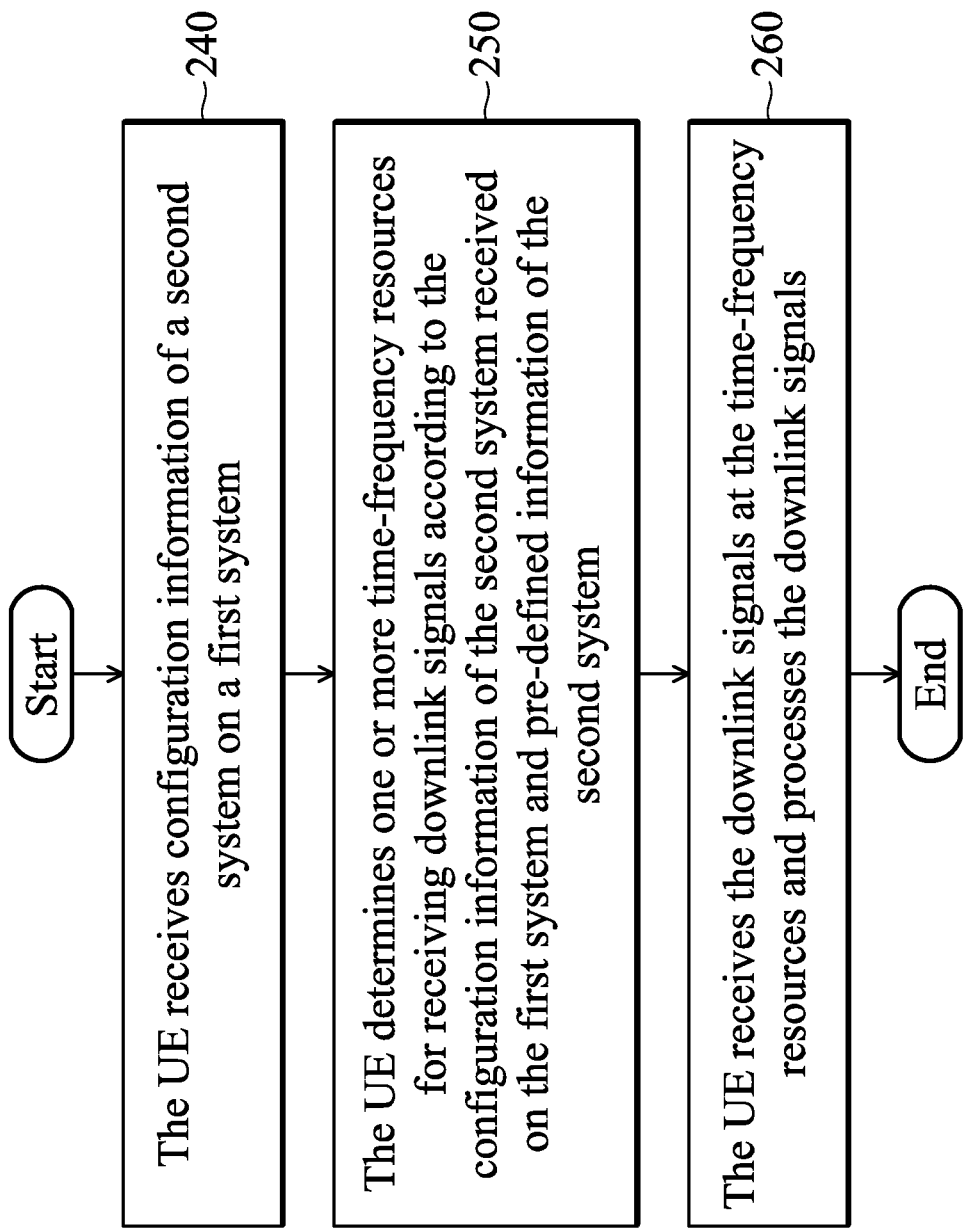
FIG. 2B is a flowchart of receiving DL signals by a UE according to one embodiment of the invention.

FIG. 2B is a flowchart of receiving DL signals by a UE according to one embodiment of the invention. As shown in FIG. 2B, in another embodiment, a method for receiving signals comprises:

Step 240: The UE receives the configuration information of the second system on the first system from the base station, wherein the time-frequency resource of the first system and the time-frequency resource of the second system are overlapped, and the base station is a base station that supports the operations of both the first system and the second system. Therefore, the base station can provide the configuration information of the second system.

Step 250: The UE determines one or more time-frequency resources for receiving DL signals according to the configuration information of the second system received on the first system and pre-defined information of the second system.

Step 260: The UE receives the DL signals at the time-frequency resources and processes the DL signals.

To be more specific, in one embodiment, the information receiving device 181 of the UE may be operable to receive the configuration information of the second system on the first system; the DL signal processing device 182 may be operable to receive and process the DL signals; the processor 122 may determine one or more time-frequency resources for receiving the DL signals based on the configuration information of the second system received on the first system and pre-defined information of the second system and controls the DL signal processing device 182 to receive the DL signals at the determined time-frequency resource and process the DL signals.

In the above embodiments, the configuration information of the second system may comprise one or more of the followings: the frequency domain position of the time-frequency resources used by the second system, a cell ID of the second system (for example, the base station may notify the UE of whether the cell ID of the second system is the same as the cell ID of the first system), all or a portion of the reference signals information of the second system, system frame number (SFN) of the second system and time domain position of the time-frequency resources used by the second system. The pre-defined information of the second system may comprise one or more of the followings: the time-frequency resources of broadcast information of the second system, the time-frequency resources of a synchronization signal of the second system, the sequence of the synchronization signal of the second system, and all or a portion of the reference signal information of the second system. The reference signal information of the second system comprises one or more of the followings: reference signal power information of the second system (for example, the power offset of the reference signal of the second system and the reference signal of the first system, or the power offset of the reference signal of the second system and the data channel signal of the second system, or the power offset of the reference signal of the second system and the data channel signal of the first system), a sub-frame carrying the reference signal of the second system (for example, the sub-frame #0, #4, #5, #9; in another example, the sub-frames which are not the Multicast-Broadcast Single Frequency Network (MB-SFN) sub-frames of the first system; in another example, the sub-frames used for transmitting DL broadcast channel signals; for example, all the sub-frames), the parameters for generating a reference signal sequence of the second system (for example, the cell ID of the second system, the slot number of the second system and the sub-frame number of the second system) and the information (for example, the cell ID of the second system, the slot number of the second system and the sub-frame number of the second system) for calculating the position of a time-frequency resource of the reference signal of the second system in a sub-frame. In an implementation, the first system is an LTE system and the second system is an NB-IoT system. It should be noted that, in another implementation, the first system may also be an NB-IoT system while the second system is an LTE system. However, to avoid confusion, the first system is basically assumed to be an LTE system and the second system is assumed to be an NB-IoT system in the embodiment of the specification.

In one embodiment of the invention, the base station transmits the configuration information of the second system to the UE via high-layer signaling (e.g., RRC signaling) or physical layer signals, such as DL Control Information (DCI). For example, the base station transmits the configuration information of the second system through the broadcast channel of the first system or transmits the configuration information of the second system through a UE specific signal. The UE may receive the configuration information of the second system through the high-level signaling (e.g., RRC signaling) or the physical layer signals such as the DCI. For example, the UE may receive the broadcast channel of the first system to obtain the configuration information of the second system. In another example, the UE may receive the UE specific signal to obtain the configuration information of the second system. Furthermore, in one embodiment of the invention, a part of the UEs in the first system can recognize the information of the second system, and the other part of the UEs in the first system cannot recognize the information of the second system, i.e., the legacy UE. When the base station serves a UE that can recognize the information of the second system, the base station may adopt the rate-matching approach to solve the problem of overlapping resources in the two systems. When the base station serves a UE that cannot recognize the information of the second system, the base station may adopt the puncturing approach to solve the problem of overlapping resources in the two systems. The rate-matching method and the puncturing approach are well known in the art, and are omitted here for brevity.

On the other hand, for a UE that cannot recognize the information of the second system, such as a version 11 (Rel-11) or version 12 (Rel-12) LTE UE, the base station may configure the resources occupied by the second system as the resources of the EPDCCH search space for the UE that cannot recognize the information of the second system. After receiving the resource configuration in which the EPDCCH search space overlaps with the PDSCH resource, a UE that cannot recognize the information of the second system may perform rate-matching for the resources of the EPDCCH search space.

Figure 3A:
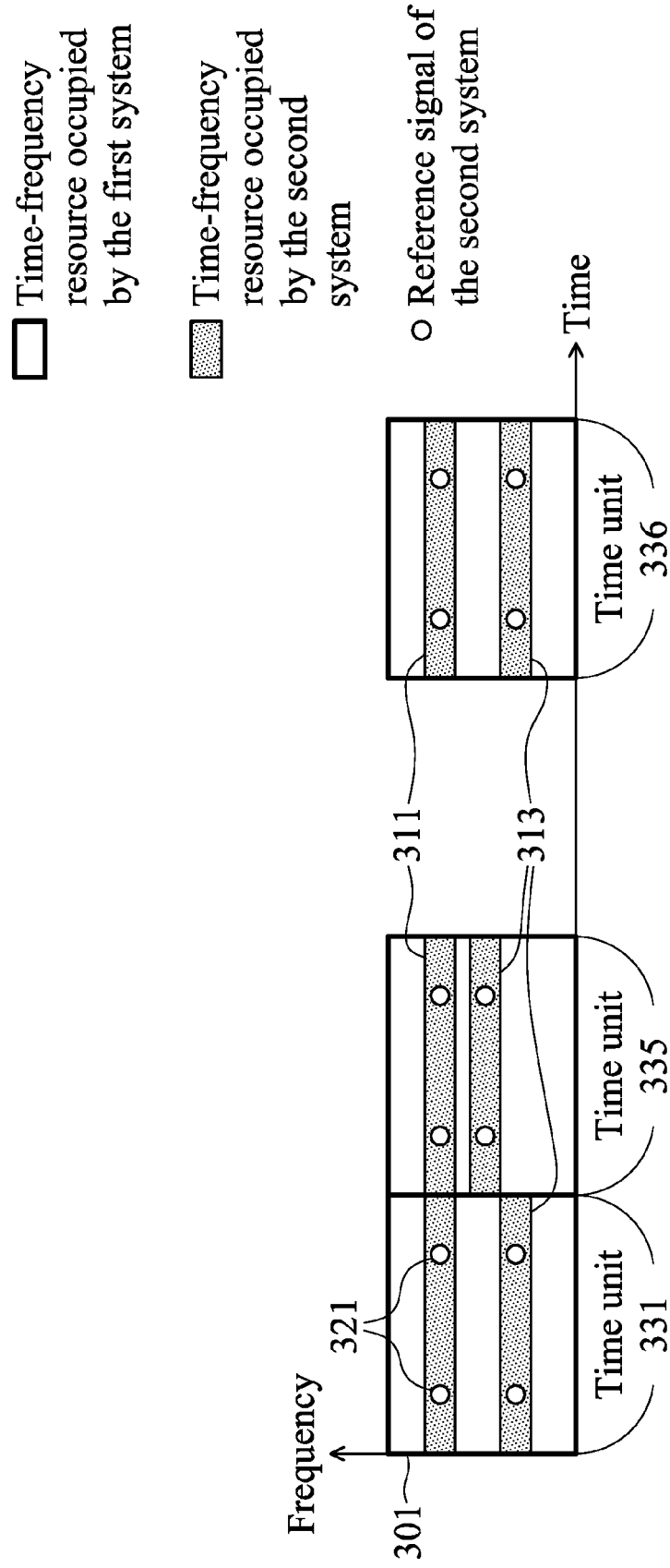
FIGS. 3A-3C are schematic diagrams of time-frequency resources in which the resources of the first system and second system are overlapped according to one embodiment of the invention.
Figure 3B:
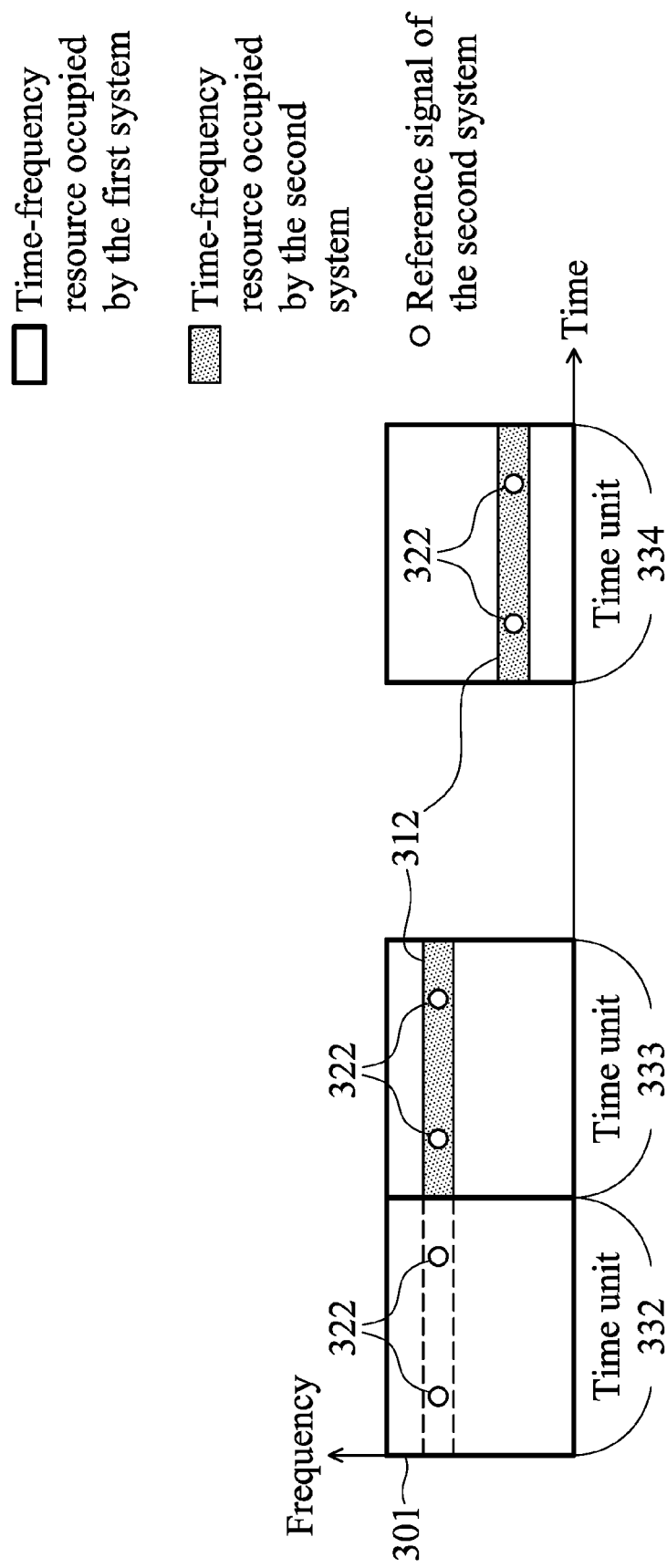
Figure 3C:
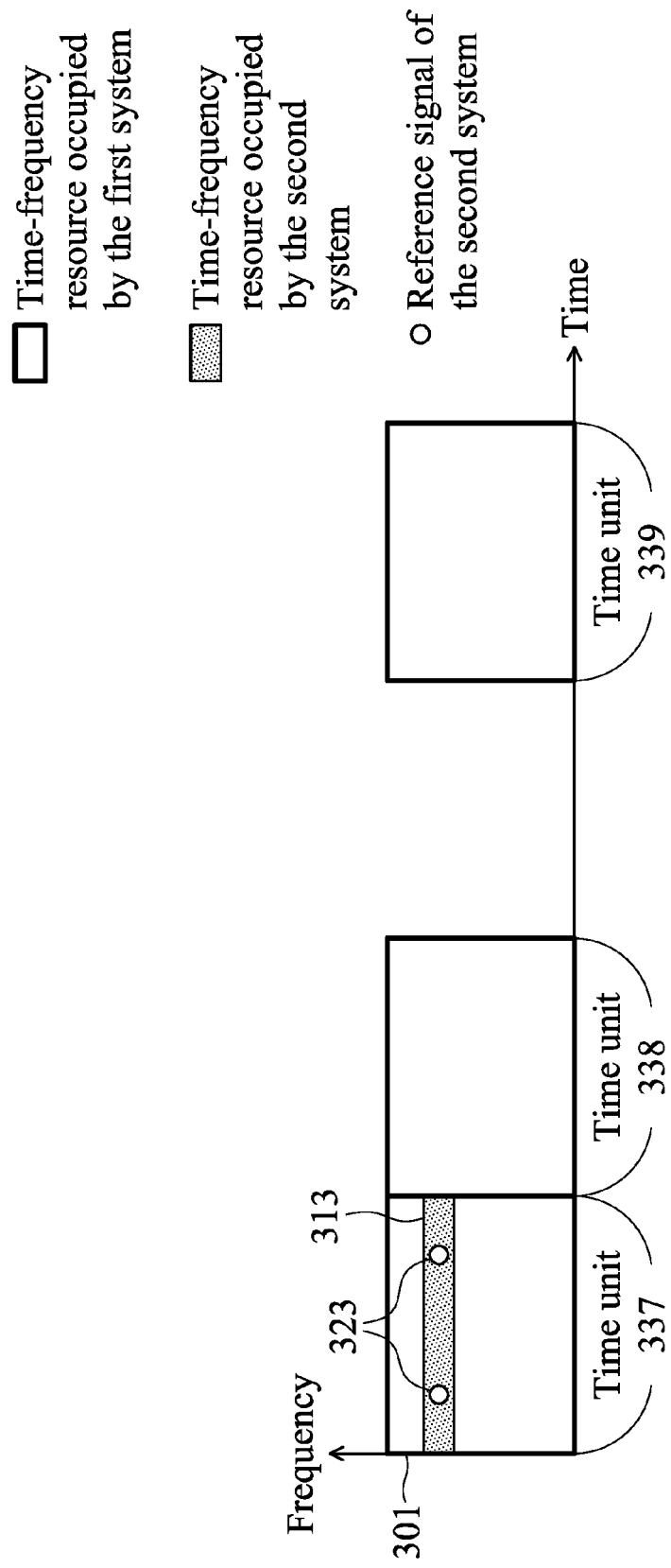

FIGS. 3A-3C are schematic diagrams of time-frequency resources in which the resources of the first system and second system are overlapped according to one embodiment of the invention. As shown in FIG. 3A, the time-frequency resources 301 are occupied by the first system, and the time-frequency resources occupied by the second system partially overlap the time-frequency resources 301 of the first system. In the embodiments of the invention, the time-frequency resources occupied by the first system may refer to the resources that can be used, scheduled or configured by the first system (e.g. may be used, scheduled or configured by the base station for providing the services of the first system), and the time-frequency resources occupied by the second system may refer to the resources that can be used, scheduled or configured by the second system (e.g. may be used, scheduled or configured by the base station for providing the services of the first system). In one example, the time-frequency resources of the second system partially overlap with the time-frequency resources 301 of the first system at each time unit 331, 335 and 336 (time units may be the sub-frames, timeslots or symbols). The time-frequency resources 311 of the second system occupy the same frequency position on the time-frequency resources of the first system in different time units, and the time-frequency resources 313 of the second system occupy different frequency positions in different time units. As shown in FIG. 3B, the time-frequency resource 312 of the second system occupies the time-frequency resources of the first system in the only some time units, e.g., 333 and 334. The time-frequency resources may locate at the same frequency domain position or different frequency domain positions. In one example, only the reference signal 322 of the second system occupies all the time units and the other DL channel occupies part of the time units, As shown in FIG. 3C, the reference signal also occupies only part of the time units, such as the reference signal 323 which appears only on the time unit 337 and does not appear on the time units 338 and 339.

Figure 4A:
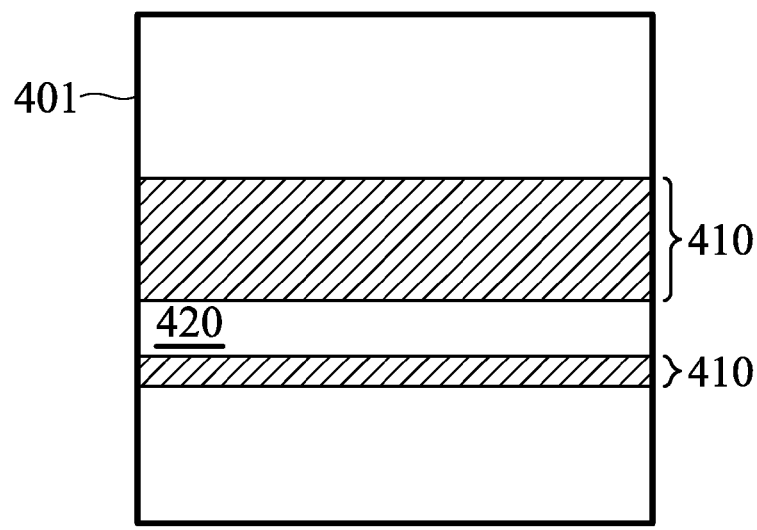
FIGS. 4A-4B are schematic diagrams of receiving and decoding DL channel or detecting DL signals on a time-frequency resource of a first system after the UE precluding the time-frequency resources occupied by the second system according to the configuration information of the second system according to one embodiment of the invention.
Figure 4B:
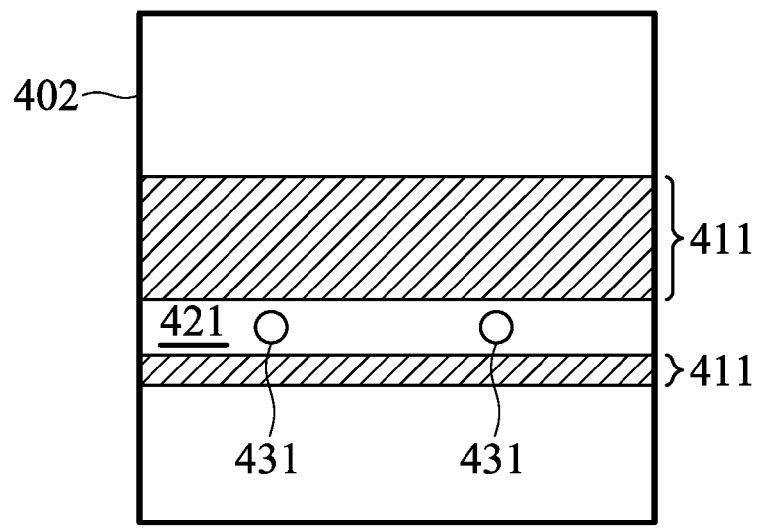

FIGS. 4A-4B are schematic diagrams of receiving and decoding DL channel or detecting DL signals on a time-frequency resource of a first system after the UE precluding the time-frequency resources occupied by the second system according to the configuration information of the second system according to one embodiment of the invention. As shown in FIGS. 4A-4B, the time-frequency resource occupied by the first system is 401 or 402. The UE of the first system obtains the time-frequency resources 410 or 411 of the first system by precluding the time-frequency resources 420 or 431 occupied by the second system according to the configuration information of the second system received on the time-frequency resource 401 or 402 occupied by the first system. The UE of the first system receives and decodes DL channel or detects DL signals on the time-frequency resources 410 and 411 of the first system. Here, precluding the time-frequency resource occupied by the second system means that the time-frequency resources occupied by the second system are not used. In one example, the time-frequency resources occupied by the second system are the entire the frequency domain resource 420. In another example, the time-frequency resources occupied by the second system are only the time-frequency resource 431 occupied by the reference signal of the second system. In one case, from the UE's point of view, no matter whether the resource occupied by the second system is actually used for transmitting the channel signal of the second system, the UE assumes that the resource is used and the UE decodes the DL signals or detects the DL signals on the resources 410 and 411 as the time-frequency resources 420 and 411 occupied by the second system have been eliminated. From the base station's point of view, the time-frequency resource occupied by the second system may be utilized to transmit a signal of the second system, or for the first system UE, such as the legacy UE, which does not receive the configuration information of the second system. In another example, the UE assumes that the signals of the second system are transmitted only on the position of the time-frequency resource 431 of the reference signal, and the signals of the second system are not transmitted on the remaining time-frequency resources of 421. The base station may transmit the signal of the first system on the positions of the time-frequency resource 421 except for the position of the time-frequency resource 431 for the reference signal of the second system.

Figure 5:
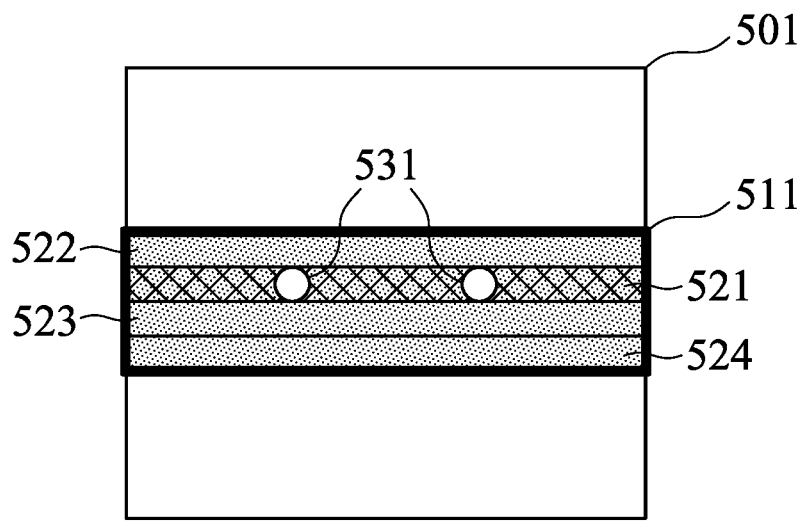
FIG. 5 is a schematic diagram of transmitting the channel signal of the first system when the second system exists according to one embodiment of the invention.

FIG. 5 is a schematic diagram of transmitting the channel signal of the first system when the second system exists according to one embodiment of the invention. For example, a second system (e.g., NB-IoT system) is in band deployed in the first system (e.g., LTE system) 501, and the UE obtains information of the second system, such as one or more of the following: the time-frequency resource 511 occupied by the second system, the location of the second system pilot 531, etc. If the time-frequency resource 511 of the DL channel (e.g., PDSCH) allocated to the UE contains the time-frequency resource 521 of the second system, the UE performs rate-matching for the time-frequency resources occupied by the second system. That is, UE considers that the base station does not transmit PDSCH information on the time-frequency resources occupied by the second system. Note that although the time-frequency resource 511 is represented here as a time-frequency resource block PRB, the invention should not be limited to the PRB. For example, it may also be the RBG. To be more specific, if a time-frequency resource 511 allocated for a UE is a time-frequency resource block group RBG, which includes time-frequency resources PRB521, PRB522, PRB523, and PRB524, where PRB521 is the PRB occupied by the second system, the base station performs rate-matching on the decoded data according to the number of the resource element (RF) on PRB522, PRB523, and PRB524, and transmits the PDSCH. The RBG may be the smallest allocated resource and may be composed of one or more PRBs. Correspondingly, the UE knows that the PRB521 is the PRB occupied by the second system from the obtained configuration information of the second system. The UE further knows that the PDSCH channel scheduling information is transmitted in the time-frequency resource RBG 511 by decoding the DL control channel (e.g. the PDCCH), where the RBG 511 includes time-frequency resources PRB521, PRB522, PRB523, and PRB524. The UE performs rate-matching on the time-frequency resources PRB522, PRB523, and PRB524, and decoding the received signals. In another example, although the position of the time-frequency resource PRB521 of the second system has been allocated for the UE, the base station only performs rate-matching on the position of the time-frequency resource 531 for reference signal of the second system. That is, the base station calculates the number of resources (e.g., RE number) for transmitting the PDSCH by subtracting only the number of resources at the position of the time-frequency resource 531 of the reference signal of the second system. If the PRB521 has been used in transmission for the second system, the transmission of the PDSCH signal of the first system may be performed by puncturing on the PRB521. Correspondingly, the UE also performs rate-matching for the first system only on position of the time-frequency resource 531 of reference signal of the second system. That is, although the PDSCH of the UE is not transmitted at this time, the UE considers that the PDSCH of the UE is transmitted on the other resource of the PRB 521, and considers that calculation of the number of resources for rate-matching of transmitting signal subtracts only the number of resources of the time-frequency resource 531 of reference signal of the second system. At this point, the decoding performance of the UE will be affected. Which one of the above-mentioned approaches, that is, precluding the position of the time-frequency resource PRB521 and precluding only the position time-frequency resource 531 of reference signal of the second system, is used can be pre-defined in the standard.

Figure 6:
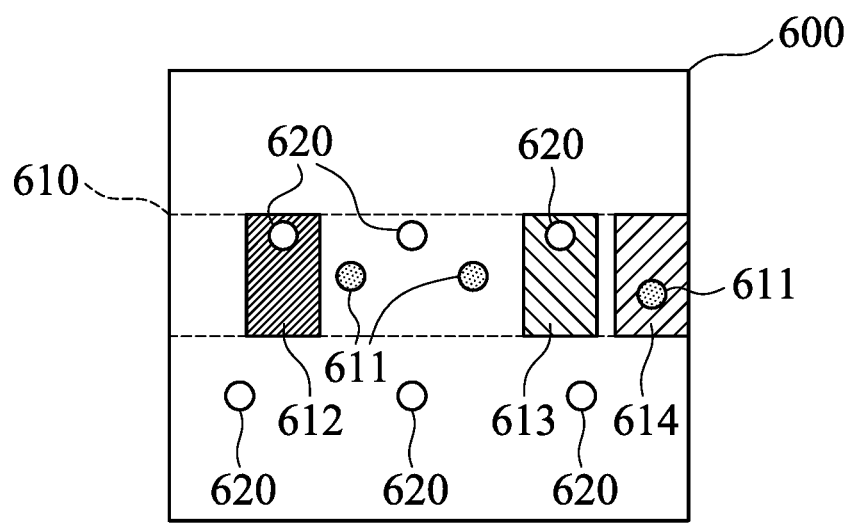
FIG. 6 is a schematic diagram of the UE performing detection based on the signals of the second system according to one embodiment of the invention.

FIG. 6 is a schematic diagram of the UE performing detection based on the signals of the second system according to one embodiment of the invention. It should be noted that, in the embodiment, the UE is a UE operating on the second system, for example, an NB-IoT UE, and, in another example, an IoT terminal. In other embodiments not otherwise illustrated, the UE is an LTE UE. As shown in FIG. 6, the UE detects the signal of the second system based on the configuration information of the second system received on the time-frequency resource 600 occupied by the first system, wherein the second system occupies the time-frequency resource 610. The signal of the second system is the synchronization signal 612 of the second system or the reference signal 611 of the second system.

In one example, the UE detects the synchronization signal 612 of the second system to obtain the cell ID of the second system. Furthermore, the UE decodes the first broadcast channel 613 of the second system according to the configuration information of the second system, such as the PRB position, and more detailed configuration information of the second system is obtained therefrom. For example, the position of the time-frequency resource of the second broadcast channel 614, such as the PDSCH carrying the SIB, of the second system may be obtained from the information carried in the first broadcast channel 613 (e.g., PBCH) of the second system. The UE may perform data-matching on the second broadcast channel 614 for the subsequent subframes. Furthermore, such behavior may be specified in the technical standards, or such behavior may not be specified in the technical standard. The base station punches on the position of the time-frequency resource of the broadcast channel of the second system. Since the UE has accurately obtained the position of the time-frequency resource of the broadcast channel of the second system, the UE may perform rate-matching accordingly. In this manner, irrelevant interference will not be introduced, thereby improving the decoding performance. In another example, the UE performs the DL offset or timing estimation by detecting the synchronization signal of the second system. To be more specific, the UE may use the synchronization signal of the first system, such as the synchronization signal 620, the reference signal, and the synchronization signal or the reference signal of the second system to estimate the DL frequency offset or timing, thereby improving the estimation accuracy. In another example, the UE detects the reference signal 611 of the second system to improve the channel estimation performance for demodulation or to improve the performance of the DL channel measurements.

In one embodiment, the base station configures transmission of the information of the second system that occupies part of the resources of the first system, wherein the information of the second system comprises one or more of the followings: the presence of the second system (e.g., according to the setting of the configuration information, the second system presents when the base station supports the operation of the second system), the frequency domain position of the second system, a cell ID of the second system, reference signal information of the second system, system frame number SFN of the second system and time domain position of the second system. Some of the above information may also be provided in a predefined manner. For example, in some cases, the first system only needs to inform the user served by the first system of the presence of the second system, and the position that the second system appears or may appear can be obtained by pre-defined rules. For example, according to a predefined channel raster interval, for example 100 kHz, the UE can deduce the frequency domain position that the second system may appear. If the system bandwidth of the first system is small, the frequency domain position that the second system may appear may be unique.

Figure 7A:
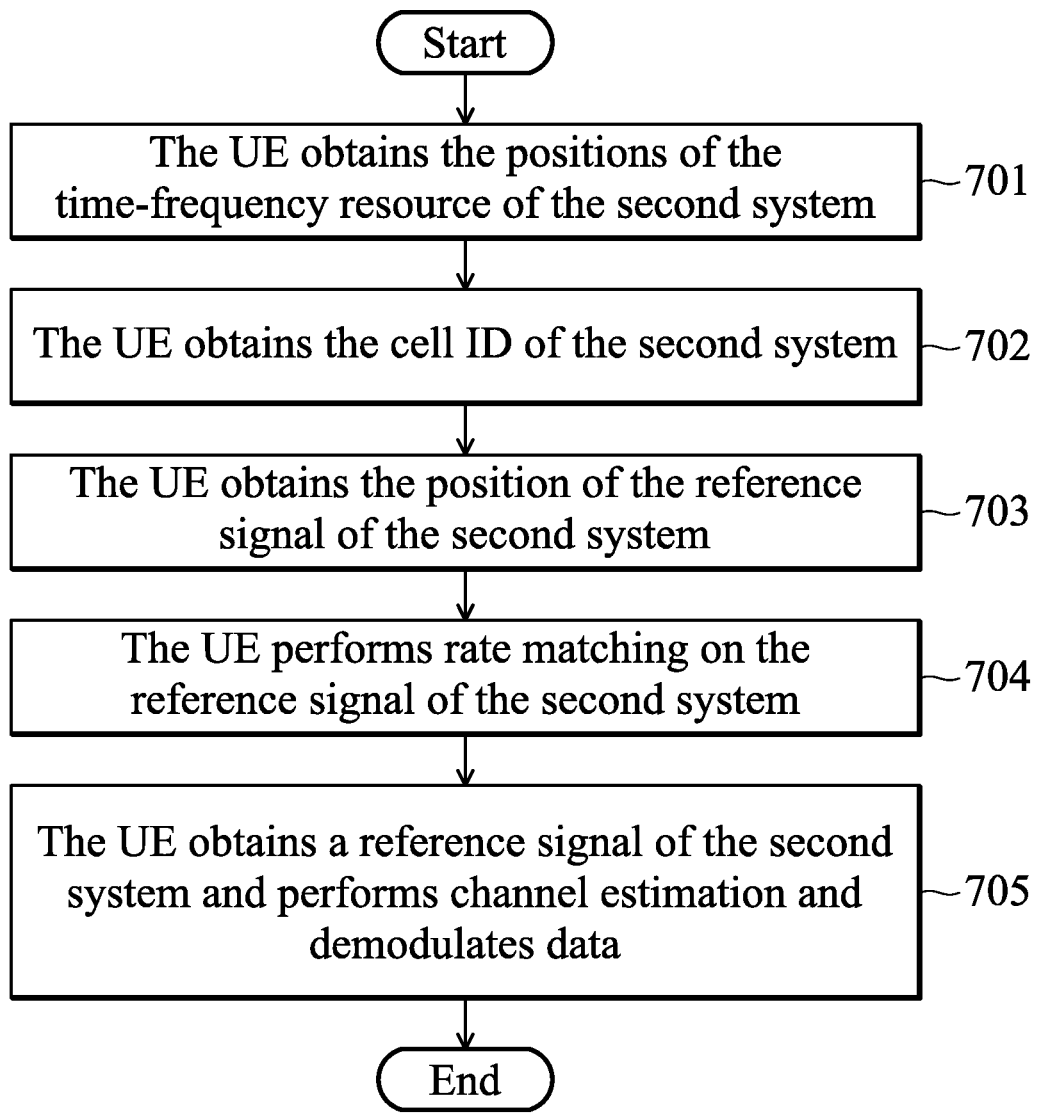
FIG. 7A is a flow diagram of rate-matching performed by the UE according to the acquired time-frequency resource position of the second system according to one embodiment of the invention.

FIG. 7A is a flow diagram of a rate-matching performed by the UE according to the acquired time-frequency resource position of the second system according to one embodiment of the invention. In this embodiment, the maximum system bandwidth of the second system is narrower than the maximum system bandwidth of the first system. In the embodiment, the first system is an LTE system, the second system is an NB-IoT system, and the UE in this embodiment is a UE operating on the first system, such as an LTE UE. The maximum system bandwidth of the second system is narrower than the maximum system bandwidth of the first system. In this example, the UE obtains the positions of the time-frequency resources of the second system from the configuration information of the second system received from the base station receiving on the first system. The UE receives a DL channel signal comprising the time-frequency resource position of the second system, and performs rate-matching for the time-frequency resources occupied by the second system. Referring to FIG. 7A, as shown in FIG. 7A, in step 701, the UE obtains the positions of the time-frequency resource of the second system (e.g., by the configuration information of the second system). In step 702, the UE obtains the cell ID of the second system (e.g., by the configuration information of the second system or by detecting the second cell synchronization signal according to a predefined rule). In step 703, the UE obtains the position of the reference signal of the second system. Then in step 704, the UE performs rate-matching on the reference signal of the second system. Wherein in step 703, UE may obtain the position of the reference signal of the second system by a predefined rule and one or more of the followings: a system cell ID, the position of time-frequency resources of the second system, and the sub-frame that the reference signal of the second system presents. The above information may be obtained from the configuration information of the second system or pre-defined in the standards. In addition, the UE may further obtain the reference signal of the second system based on the above information. In another example, in step 705, the UE may obtain a reference signal of the second system and perform channel estimation and demodulate the data of the first system according to the reference signal of the second system. In another example, the UE may perform measurements based on the reference signal of the second system, or estimate the frequency offset, the timing offset, etc. The power information of the reference signal of the second system may also be required during data demodulation using the reference signal of the second system. In addition, in order to enable the UE to perform data demodulation or channel measurement on the data of the first system according to the reference signal of the second system, the mapping relationship between the reference signals of first system and the second system should be predefined. For example, the antenna ports #0, #1 in the first system are mapped to the antenna ports #0, #1 of the second system, to undergo the same processing and transmission and experience the same channel. For example, the antenna ports #0, #1 of the first system and the antenna ports #0, #1 of the second system are mapped to each other by a pre-defined matrix.

On the contrary, for example, the NB-IoT system demodulates the data channel of the NB-IoT system according to the system reference signal NB-RS and the CRS of the LTE system. That is, in this embodiment, the first system is an NB-IoT system, the second system is an LTE system, and the UE in this embodiment is a UE operating on a second system, such as an LTE UE. The maximum system bandwidth of the second system is broader than the maximum system bandwidth of the first system. Thus, the UE of the second system demodulates the data signal of the second system by using the reference signals of the second system and the first system, wherein the time-frequency resources of the second system and the time-frequency resources of the first system are overlapped. When the first system is an NB-IoT system and the second system is an LTE system, the first system occupies part of the time-frequency resources of the second system. For this case, please refer to FIG. 7B.

Figure 7B:
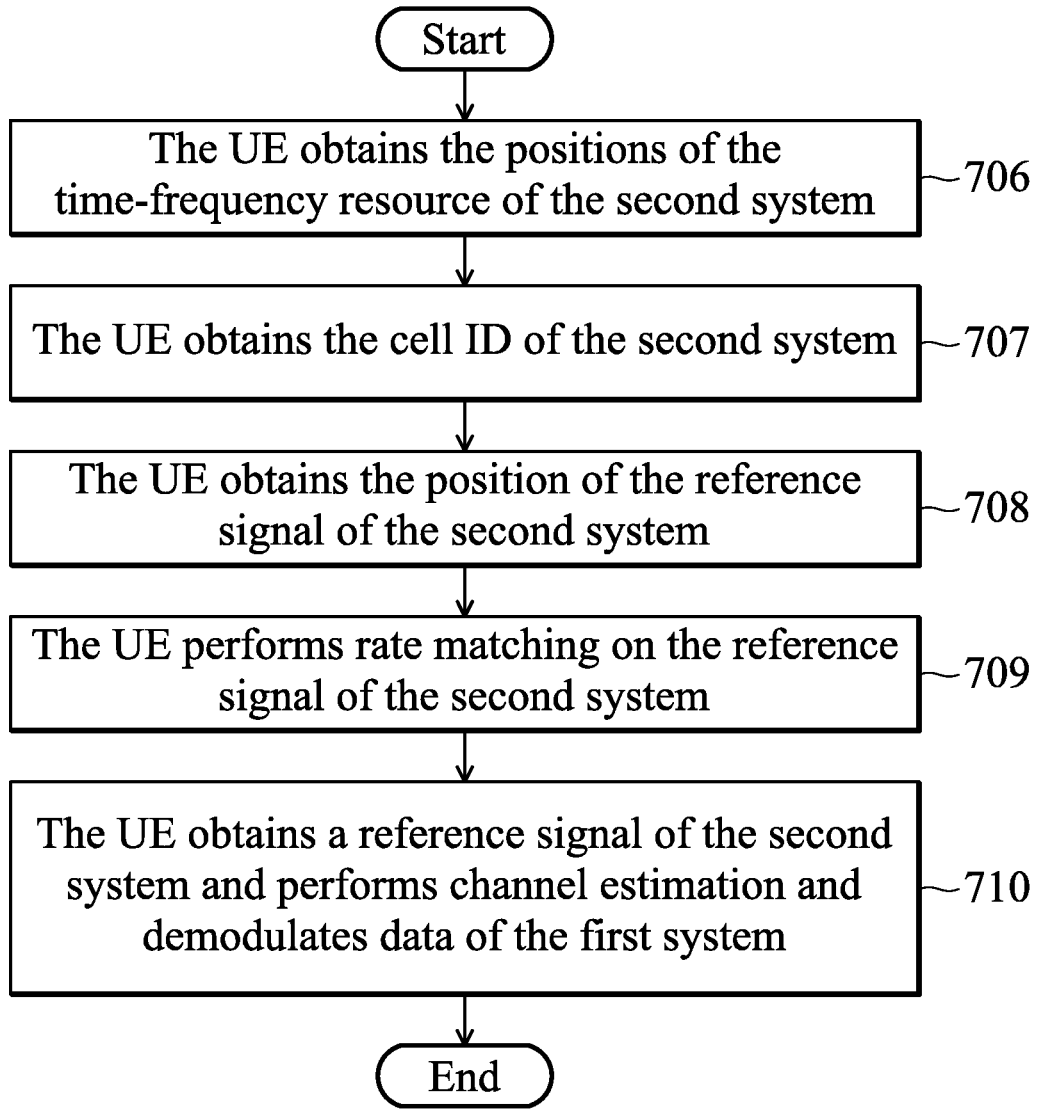
FIG. 7B is a flow diagram of rate-matching performed by the UE according to the acquired time-frequency resource position of the second system according to one embodiment of the invention.

FIG. 7B is a flow diagram of rate-matching performed by the UE according to the acquired time-frequency resource position of the second system according to one embodiment of the invention. In this embodiment, the maximum system bandwidth of the second system is broader than the maximum system bandwidth of the first system. In the embodiment, the first system is an NB-IoT system, the second system is an LTE system, and the UE in this embodiment is a UE operating on a first system, such as an NB-IoT UE. The maximum system bandwidth of the second system is broader than the maximum system bandwidth of the first system. In this example, the UE obtains the positions of the time-frequency resources of the first system from the configuration information of the first system received from the base station on the second system. The UE receives a DL channel signal comprising the time-frequency resource position of the first system, and performs rate-matching for the time-frequency resources occupied by the second system. Referring to FIG. 7B, as shown in FIG. 7B, in step 706, the UE obtains the positions of the time-frequency resource of the second system (e.g., through the configuration information of the second system). In step 707, the UE obtains the cell ID of the second system (e.g., through the configuration information of the second system or by detecting the second cell synchronization signal according to a predefined rule). In step 708, the UE obtains the position of the reference signal of the second system. Then in step 709, the UE performs rate-matching on the reference signal of the second system. Wherein in step 708, the UE may obtain the position of the reference signal of the second system by a predefined rule and one or more of the followings: a system cell ID, the position of time-frequency resources of the second system, and the sub-frame that the system reference signal of the first system presents. The above information may be obtained from the configuration information of the second system or pre-defined in the standards. In addition, the UE may further obtain the reference signal of the first system based on the above information. In another example, in step 710, the UE may obtain a reference signal of the second system and perform channel estimation and demodulate the data of the first system according to the reference signal of the second system. In another example, the UE may perform measurements based on the reference signal of the second system, or estimate the frequency offset, the timing offset, etc. The power information of the reference signal of the second system may also be required during data demodulation using the reference signal of the first system.

Figure 8:
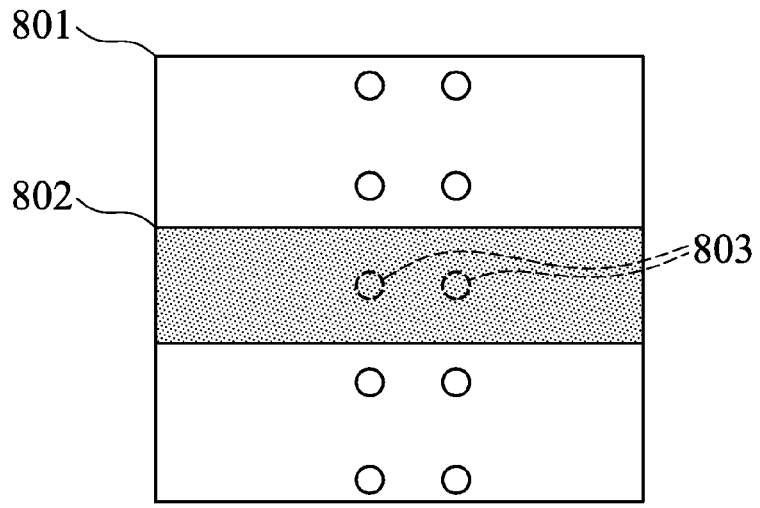
FIG. 8 is a schematic diagram of a UE detecting a reference signal of a first system using a puncturing method according to one embodiment of the invention.

FIG. 8 is a schematic diagram of UE detecting a reference signal of a first system using a puncturing method according to one embodiment of the invention. As shown in FIG. 8, the base station configures a reference signal (e.g., CSI-RS) of the first system occupying the entire bandwidth 801 for the UE capable of acquiring the second system information, and transmits the reference signal 803 of the first system on the time-frequency resource 802 (e.g., PRB) occupied by the second system. Correspondingly, the UE obtains information regarding the position of the time-frequency resource 802 occupied by the second system, and the UE punctures at the position of the reference signal of the first system on the time-frequency resource 802 (i.e., the UE assumes that the reference signal 803 of the first system will not be transmitted on the time-frequency resource 802 occupied by the second system), and detects the reference signal after puncturing.

According to another novel aspect, the time-frequency resource (e.g., PRB) configured for the EPDCCH search of the first system may contain the time-frequency resource occupied by the second system, but the EPDCCH is not transmitted on the time-frequency resource occupied by the second system. For example, in the LTE system, for the UE of Release 11 (Rel-11) and later, the base station configures EPDCCH configuration (EPDCCH-Config) information element (IE). The contents of the EPDCCH configuration IE are described in the relevant specifications and are not described here for brevity.

Figure 9:
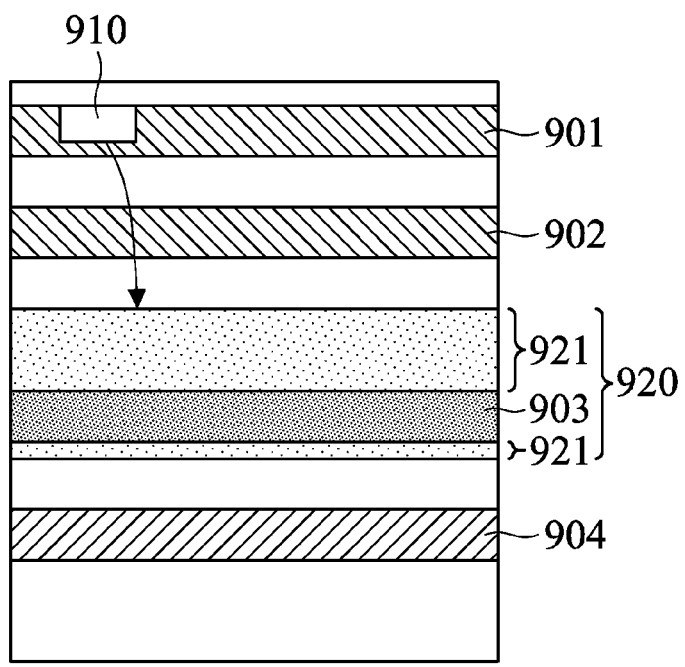
FIG. 9 is a schematic diagram of a base station transmitting the signal of the first system and the signal of the second system and the data-matching of the UE for a channel of the first system according to one embodiment of the invention.

FIG. 9 is a schematic diagram of transmitting the signal of the first system and the signal of the second system by the base station and the data-matching by the UE for a channel of the first system according to one embodiment of the invention. In FIG. 9, the UE may detect one or more PRB groups (e.g., via EPDCCH-SetConfigToAddModList-r11 (Release 11, EPDCCH configuration to add modification list fields)), which contains 2, 4, or 8 PRBs (configured by field numberPRB-Pairs-r11) and specify the position of the PRB by the field resourceBlockAssignment-r11 (Release 11, resource block allocation field). As shown in FIG. 9, the UE detects that one PRB group comprising PRB 901 and PRB 902, and another PRB group comprising PRB 903 and PRB 904. In one example, the base station obtains the PRB position (e.g. PRB903) occupied by the second system according to a PRB group (for example, consisting of PRB903 and PRB904) that is configured by the field of the resourceBlockAssignment-r11 (Release 11, resource block allocation field). In this configuration, the base station may transmit the DL channel or signal of the EPDCCH of the first system or the second system (e.g., NB-IoT) on the PRB 903 of each sub-frame according to the actual situation. If the PRB 903 occupied by the second system is actually utilized to transmit the DL channel or signal of the second system, the base station may transmit the EPDCCH on other PRBs in the UE search space (UESS), e.g., transmitting the EPDCCH 910 on the PRB 901. Similarly, the base station may provide the configured information of the second system to the existingRelease UE (Rel-13 LTE UE) and actually transmit the other new systems of the future evolved version so as to avoid the impact of other systems on the existing Release UE. In view of the characteristics of NB-IoT, as well as the characteristics of distributed and localized EPDCCH, the NB-IoT system PRB is more suitable to be configured as distributed EPDCCH search space (SS).

Furthermore, the UE obtains the resource 920 indicated by the resource allocation of a DL channel (e.g., PDSCH), wherein the resource 920 indicated by the resource allocation of the DL PDSCH contains the PRB 903. In one example, the PRB903 is a PRB of the EPDCCH search space resources. In another example, the PRB 903 is configured by the base station for transmitting the resources of the second system. The UE performs rate-matching on the PRB 903, i.e. the UE considers the DL channel (e.g., PDSCH) is transmitted only on the resource 921 on which the PRB 903 is eliminated. Compared to the transmission using puncturing, the performance of this approach can be improved. The way of puncturing is that the base station transmits the channel or signal of the second system on the PRB 903 and transmits the DL channel of the UE on the resource 921. However, the UE considers that the DL channel is transmitted on all the allocated resources 920, and when decoding, the signal on the PRB 903 will interfere with the actual transmission signal, thereby reducing the performance.

While the specific embodiments are incorporated herein by reference for purposes of illustration, the scope of the invention is not limited thereto. Accordingly, alterations, modifications and combinations of the features in the described embodiments may be practiced without departing from the spirit of the invention, the scope of which is defined by the claims.

What is claimed is:

1. A method for receiving downlink channel signals, comprising:
   receiving configuration information of a second system on a first system by a user equipment (UE), wherein time-frequency resources of the first system and time-frequency resources of the second system are overlapped;
   determining one or more time-frequency resources for receiving downlink (DL) signals according to pre-defined information of the second system or the configuration information of the second system by the UE;
   receiving the DL signals at the time-frequency resources by the UE; and
   processing the DL signals according to the configuration information of the second system,
   wherein the pre-defined information of the second system comprises one or more of the followings: time-frequency resources of broadcast information of the second system, time-frequency resources of a synchronization signal of the second system, a sequence of the synchronization signal of the second system and reference signal information of the second system, wherein the reference signal information of the second system comprises one or more of the followings: reference signal power information of the second system, a sub-frame carrying the reference signal of the second system, a parameter for generating a reference signal sequence of the second system and information for calculating a position of a time-frequency resource of the reference signal in a sub-frame of the second system, and wherein the reference signal power information of the second system comprises power offset of the reference signal of the second system and the reference signal of the first system, or power offset of the reference signal of the second system and the data channel signal of the second system, or power offset of the reference signal of the second system and the data channel signal of the first system.

2. The method of claim 1, wherein the maximum system bandwidth of the second system is narrower than the maximum system bandwidth of the first system.

3. The method of claim 1, wherein the maximum system bandwidth of the second system is broader than the maximum system bandwidth of the first system.

4. The method of claim 1, wherein the configuration information of the second system comprises one or more of the followings: presence of the second system, a frequency domain position of the time-frequency resources used by the second system, a cell identifier (ID) of the second system, reference signal information of the second system, system frame number (SFN) of the second system and a time domain position of the time-frequency resources used by the second system.

5. The method of claim 1, wherein the step of determining one or more time-frequency resources for receiving the DL signals according to the configuration information of the second system further comprises:
precluding the time-frequency resources occupied by the second system according to the configuration information of the second system received on the first system to obtain the time-frequency resources available for the first system.

6. The method of claim 5, wherein the steps of receiving the DL signals at the time-frequency resources by the UE and processing the DL signals according to the configuration information of the second system further comprises:
receiving the DL signals at the time-frequency resources of the first system after precluding the time-frequency resources occupied by the second system, and decoding or detecting the DL signals.

7. The method of claim 6, wherein the time-frequency resources occupied by the second system are the whole time-frequency positions occupied by the second system or the time-frequency resources occupied by the reference signal of the second system.

8. A user equipment (UE) for receiving downlink (DL) channel signals and operating on a first system, comprising:
an RF transceiver, receiving RF signals, receiving configuration information of a second system on the first system and receiving DL signals; and
a processor, determining one or more time-frequency resources for receiving the DL signals according to the configuration information of the second system received on the first system, and processing the DL signals received at the time-frequency resources according to the configuration information of the second system, wherein the time-frequency resource of the first system and the time-frequency resource of the second system are overlapped, wherein the processor determines the one or more time-frequency resources for receiving the DL signals further according to pre-defined information of the second system, wherein the pre-defined information of the second system comprises one or more of the followings: time-frequency resources of broadcast information of the second system, time-frequency resources of a synchronization signal of the second system, a sequence of the synchronization signal of the second system and reference signal information of the second system, wherein the reference signal information of the second system comprises one or more of the followings: reference signal power information of the second system, a sub-frame carrying the reference signal of the second system, a parameter for generating a reference signal sequence of the second system and information for calculating a position of a time-frequency resource of the reference signal in a sub-frame of the second system, and wherein the reference signal power information of the second system comprises power offset of the reference signal of the second system and the reference signal of the first system, or power offset of the reference signal of the second system and the data channel signal of the second system, or power offset of the reference signal of the second system and the data channel signal of the first system.

9. The UE of claim 8, wherein the maximum system bandwidth used by the second system is narrower than the maximum system bandwidth used by the first system.

10. The UE of claim 8, wherein the maximum system bandwidth used by the second system is broader than the maximum system bandwidth used by the first system.

11. The UE of claim 8, wherein the configuration information of the second system comprises one or more of the followings: presence of the second system, a frequency domain position of the time-frequency resources used by the second system, a cell ID of the second system, reference signal information of the second system, system frame number (SFN) of the second system and a time domain position of the time-frequency resources used by the second system.

12. The UE of claim 8, wherein the processor obtains the time-frequency resources available for the first system by precluding the time-frequency resources occupied by the second system according to the configuration information of the second system received on the first system, receives the DL signals via the RF transceiver at the time-frequency resource of the first system with the time-frequency resources occupied by the second system have been eliminated, and decodes or detects the DL signals.

* * * * *